(12) United States Patent  
Swartz (10) Patent No.: US 7,420,618 B2  
(45) Date of Patent: Sep. 2, 2008

(54) SINGLE CHIP MULTI-FUNCTION DISPLAY CONTROLLER AND METHOD OF USE THEREOF

(75) Inventor: Peter D. Swartz, San Jose, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 553 days.

(21) Appl. No.: 11/004,565

(22) Filed: Dec. 3, 2004

(65) Prior Publication Data

US 2005/0134735 A1 Jun. 23, 2005

Related U.S. Application Data

(60) Provisional application No. 60/532,428, filed on Dec. 23, 2003.

(51) Int. Cl.
*H04N 7/01* (2006.01)
*H04N 5/46* (2006.01)

(52) U.S. Cl. ............... 348/554; 348/441; 348/448; 348/452

(58) Field of Classification Search .......... 348/554, 348/555, 558, 448, 441, 451, 452; *H04N 3/27, H04N 5/46, 7/01, 11/20*
See application file for complete search history.

(56) References Cited

U.S. PATENT DOCUMENTS

| | | | |
|---|---|---|---|
| 5,790,096 A | 8/1998 | Hill, Jr. | |
| 5,894,329 A | 4/1999 | Takeda et al. | |
| 6,222,589 B1 * | 4/2001 | Faroudja et al. | 348/448 |
| 6,608,610 B2 | 8/2003 | Nagai | |
| 7,158,186 B2 * | 1/2007 | Selby et al. | 348/459 |

FOREIGN PATENT DOCUMENTS

| | | |
|---|---|---|
| EP | 0 837 601 A2 | 4/1998 |
| WO | WO 03/100722 A1 | 12/2003 |

OTHER PUBLICATIONS

International Search Report dated Jan. 26, 2006 from corresponding European Patent Application No. 04258047.2.

Anonymous: "Preliminary Product Brief gm 1601-C1601-PBR-01D" Internet Article, Online!, Feb. 20, 2003, pp. 1-2, XP002362346, downloaded from http://web.archive.org/web/20030701185543/genesis-microchip.com/products/C1601-PBR-01D.PDF.

(Continued)

*Primary Examiner*—Sherrie Hsia
(74) *Attorney, Agent, or Firm*—Beyer Law Group LLP (57) ABSTRACT

A multi-function display controller that includes a source detector unit for determining if the source of an input stream is either film originated source originated or video source originated. A source converter unit for converting the input image stream to a common signal processing format is coupled to the source detector unit. Once converted to the common signal processing format, a determination is made if the input image stream is interlaced or non-interlaced (progressive scan). If the input image stream is interlaced, a de-interlace unit converts the interlaced signal to progressive scan using either motion adaptive or motion compensated de-interlacing techniques. It should be noted that in the described embodiment, motion vectors generated for use by the motion compensated de-interlace can be optionally stored in a memory unit for use in subsequent operations, such as motion compensated frame rate conversion or noise reduction (if any).

45 Claims, 4 Drawing Sheets

OTHER PUBLICATIONS

Neugebauer et al., "18.1: A High-Performance LCD Monitor Controller IC with Integrated A/D Converters," proceedings of the 1999 SID International Symposium, Seminar & Exhibition, May 20, 1999, pp. 1-4, XP007008868.

"s2300/s2301/s2310 Digital Video format Converter", Jan. 2002, Preliminary data Sheet—Rev. 0.740, Sage Inc.

* cited by examiner

SINGLE CHIP MULTI-FUNCTION DISPLAY CONTROLLER AND METHOD OF USE THEREOF

REFERENCE TO RELATED APPLICATIONS

This patent application takes priority under 35 U.S.C. 119 (e) to (i) U.S. Provisional Patent Application No.: 60/532,428, filed on Dec. 23, 2003 entitled "Single Chip Integration of Film Mode Detector, 3:2/2:2 Inverse Pulldown, Motion Adaptive/Compensated De-interlace, Noise Reducer, Frame Rate Converter, Scaler and Display Controller" which is also incorporated by reference in its entirety for all purposes.

BACKGROUND

1. Field of the Invention

The invention relates to display devices. More specifically, the invention describes a multi-function display controller for LCD displays implemented as a single integrated circuit.

2. Overview

LCD displays such as those used on portable, wireless communication devices, digital TVs, and the like are arranged in an x-y grid that is formed by an array of the rows and columns. The arrangement of such segments is done to greatly reduce the number of external connections and increase potential display density. LCD controllers are used to control the operation of the LCD display and supply the display drivers with data. There are many different configurations of LCD controllers in existence. Currently, most LCD controllers require pixel-based graphical data to be fetched from a memory circuit in a repetitive and cyclical fashion. In fetching the pixel-based graphical data, enough data for the whole display is retrieved. Furthermore, to prevent flickering of the LCD display, the data must be provided to the LCD display by the LCD controller and refreshed at a predetermined, recommended rate.

Although well suited to actually perform the above described control functions, currently configured LCD controllers rely on other circuits to perform non-LCD control functions such as Frame Rate Conversion (FRC), motion compensation, etc. thereby greatly increasing the cost and complexity of implementing these various non-control yet essential ancillary display support functions.

Therefore, what is desired is a single integrated circuit arranged to perform LCD control functions as well as ancillary support functions.

SUMMARY OF THE DISCLOSURE

A multi-function display controller that receives an input video stream from a video source includes a video source converter unit that detects a video standard corresponding to the input video stream (i.e., NTSC, PAL, 1080i, 720P etc) as well as converts the input video stream to a common signal processing format. In the described embodiment, the source converter unit sets an interlaced video flag when the input video stream is an interlaced video stream. The interlaced flag, is used to enable or bypass the deinterlacer and to modify the operation of the film originated source detector. The film originated source detector unit coupled thereto is used to determine if the input video source is a film originated source using any one of a number of inverse telecine.techniques. A de-interlace unit converts the interlaced signal to progressive scan using either motion adaptive or motion compensated de-interlacing techniques.

A frame rate converter unit then converts the progressive scan signal to a display frame rate using either drop and repeat based frame rate conversion or motion compensation based frame rate conversion based upon signal content.

An adaptive scaler unit preserves bandwidth, processing and memory resources by adaptively scaling the input video stream using a scaling protocol based upon a native resolution and a display resolution. In one embodiment, the output interface provides additional image processing such as image enhancement, edge enhancement, contrast enhancement, etc. In one implementation, an optional noise reducer unit is used remove any noise from the image stream.

In another embodiment, a method of processing an incoming video stream having a native video format from a video source to an outgoing video stream for display by a display unit at a display format by an adaptive multi-function display controller is described. The method includes the following operations converting the incoming video stream to a common video format suitable for subsequent video processing, de-interlacing the input video stream, if needed, to form a progressive scan video stream, selecting a frame rate conversion mode, converting the progressive scan video stream at a native frame rate to the display frame rate using the selected frame rate conversion mode, providing a scaling protocol based upon the native video format and the display format, scaling the input video stream as required for display on the display unit based upon the scaling protocol, and providing the outgoing video stream to the display unit.

In still another embodiment, computer program product is described for processing an incoming video stream having a native video format from a video source to an outgoing video stream for display by a display unit at a display format by an adaptive multi-function display controller.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Figure 1:
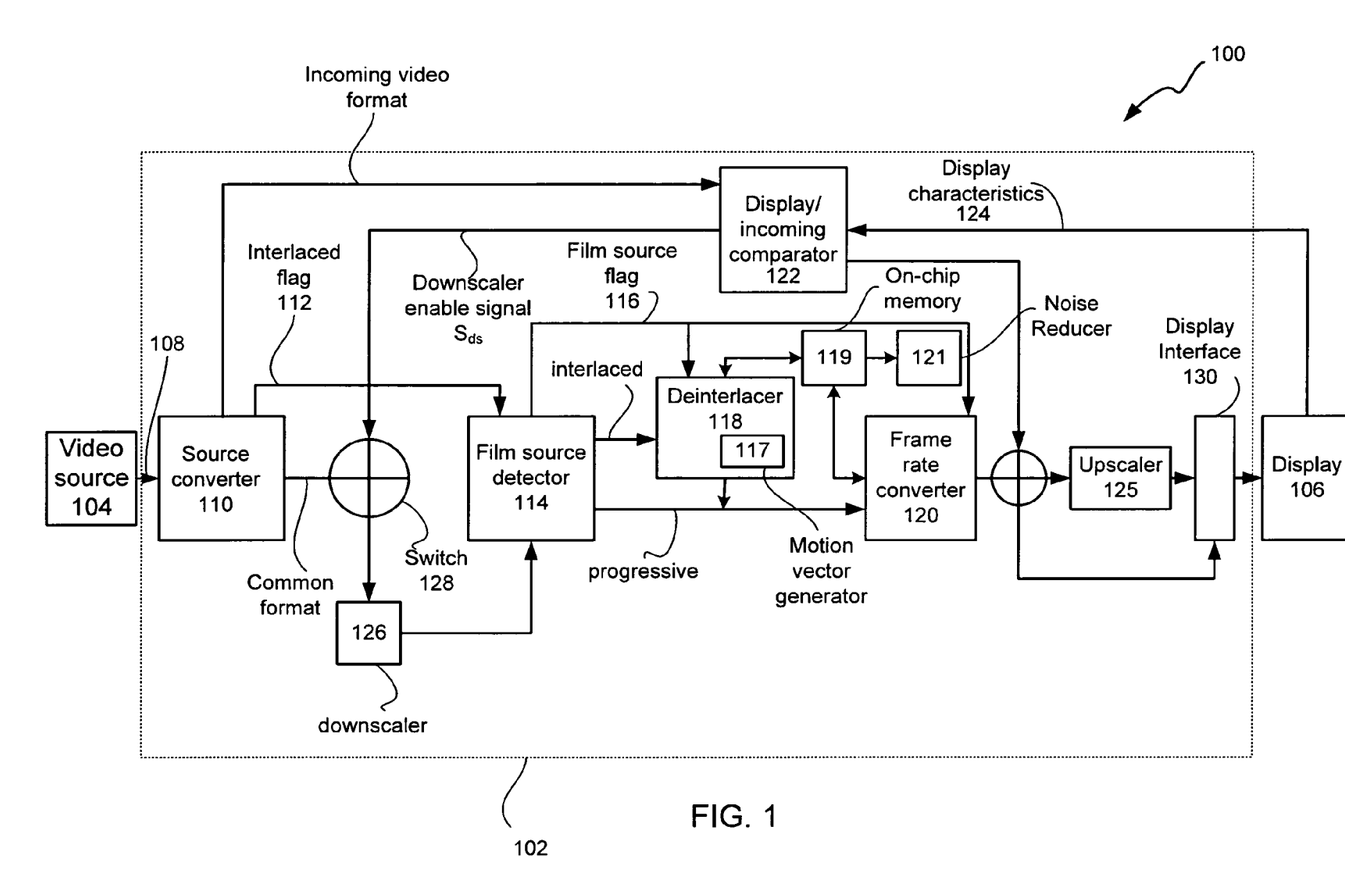
FIG. 1 shows a general configuration of a system that includes of a multi-function display controller in accordance with an embodiment of the invention.

FIG. 1 shows a general configuration of a system 100 that includes a block diagram representation of a multi-function display controller 102 coupled to a video source 104 and a display 106 in accordance with an embodiment of the invention. It should be noted that the controller 102 is well suited for implementation as a single integrated circuit and as such, can be incorporated in or coupled to the display device 106 (such as an LCD panel). The controller 102 receives an incoming video signal 108 from the video source 104 that can be either an analog signal or a digital signal. In the case where the video signal 108 is analog, the video source 104 includes some form of an analog source such as for example, an analog television broadcast, analog VCR, DVD player, camcorder, laser disk player, TV tuner, set top box (with satellite DSS or cable signal), film, and the like. In the case where the incoming video signal 108 is digital, then the video source 104 includes a digital video source such as for example a digital television broadcast (DTV), digital still camera, and the like that can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

In the case where the video source 104 provides an analog signal, an analog-to-digital converter, or ADC (not shown), included in or coupled to the controller 102 converts an analog voltage or current signal into a discrete series of digitally encoded numbers (signal) forming in the process an appropriate digital image data word suitable for digital processing. Any of a wide variety of ADC can be used. By way of example, other ADCs include, for example those manufactured by: Philips, Texas Instrument, Analog Devices, Brooktree, and others.

The controller 102 includes a video source converter unit 110 that detects a video format corresponding to the input video stream (i.e., NTSC, PAL, 1080i, 720P, SMPTE 296M-1997, etc) and converts the input video stream 108 to a common signal processing format. For example, if the video signal 108 is composite video, then the controller 102 decodes the input video stream 108 into the common signal processing format, such as for example, a format having separate luma and chroma component signals each of which are then passed on for further processing. In this way, the input video stream 108 can be converted to any video format space as deemed appropriate.

Concurrently with the formatting, the source converter unit 110 determines if the input video stream 108 is interlaced or non-interlaced (progressive scan). When the input video stream 108 is an interlaced video stream, the source converter unit 110 sets an interlaced video flag 112. This flag is used to modify the operation of the film originated source detector and to bypass the de-interlace. The film originated source detector unit 114 coupled thereto determines if the input video stream 108 is film originated. When the incoming video stream 108 is a derived from film, the film originated source detector unit 114 sets a film originated source flag 116 that is, in turn, output to a de-interlace unit 118 and a frame rate converter unit 120. In the case where both the interlaced video flag 112 and the film source flag 116 are set (i.e., the input video stream 108 is interlaced film originated video), the de-interlace unit 118 recreates the original film frames in the common video format in a process known as inverse-telecine (or 3:2/2:2 Inverse Pulldown) that senses the existing 3-2 pulldown pattern of a film originated video. Inverse telecine is useful for such purposes as producing DVD's where the only available source was video with 3-2 pulldown. For NTSC, interlaced video of 24 fps film has four of every five fields unique, for progressive scan, two out of every five frames are unique. Whenever the film flag is set, only the unique film frames are passed into the Frame Rate Converter, irrespective of whether the de-intelacer is used or not.

In any case, when the input video stream 108 is interlaced, the interlaced video stream 108 is converted to progressive scan by the de-interlace 118 using either spatial, motion adaptive or motion compensated de-interlacing techniques. As such, the de-interlace unit 118 may include a motion vector generator unit 117 for generating motion vectors. It should be noted that in the described embodiment, motion vectors generated for implementation of the motion adaptive or motion compensated de-interlacing techniques can be optionally stored in an onchip memory unit 119 for use in subsequent operations, such as motion compensated frame rate conversion or noise reduction (if any). The on chip memory unit 119 can take any appropriate form such as a data and a vector cache that allows the high bandwidth required for motion estimation and motion compensated frame interpolation as well as noise reduction optionally provided by an optional noise reducer 121.

In order to more efficiently allocate processing, memory and bandwidth related resources, a scaling factor SF is generated by a scaling factor generator unit 122 that compares the native video resolution (based on the video format detected by the source converter unit 110) and the desired output display resolution based on EDID provided by way of a data channel 124. In those cases where the native video resolution must be downscaled in order to meet the display requirements of the display 106, the input video stream 108 is appropriately downscaled by a downscaler unit 126 coupled to the source converter 110 by way of a controllable switch 128 controlled by a downscaler enable signal Sds provided by the scaling factor generator unit 122.

For example, in a particular implementation, a scaling factor indicating whether the input video stream is to be upscaled (SF >1.0), downscaled, (SF <1.0), or not scaled (SF=1.0) based upon a comparison of the resolution of the incoming video stream and display resolution provided by the data channel 124 is determined. If the scaling factor is less than 1.0 (indicative of downscaling), the downscaler unit 126 downscales the video stream whereas when the scaling factor is not less than 1.0, the downscaler unit is disabled and the input video stream is passed directly to the film originated source detector unit and subsequent upscaling, if needed.

It should be noted that as implemented, the controller 102 adaptively configures a scaling protocol based upon the native resolution of the input video stream 108 and the display requirements of the display 104 in real time. For example, for most downscaling situations (horizontal and vertical) it is optimal to downscale prior to de-interlacing and only then perform any required frame rate conversion. Therefore, as required, the controller 102 downscales the input video stream 108 as needed prior to the de-interlacing and any required frame rate conversion.

Figure 2:
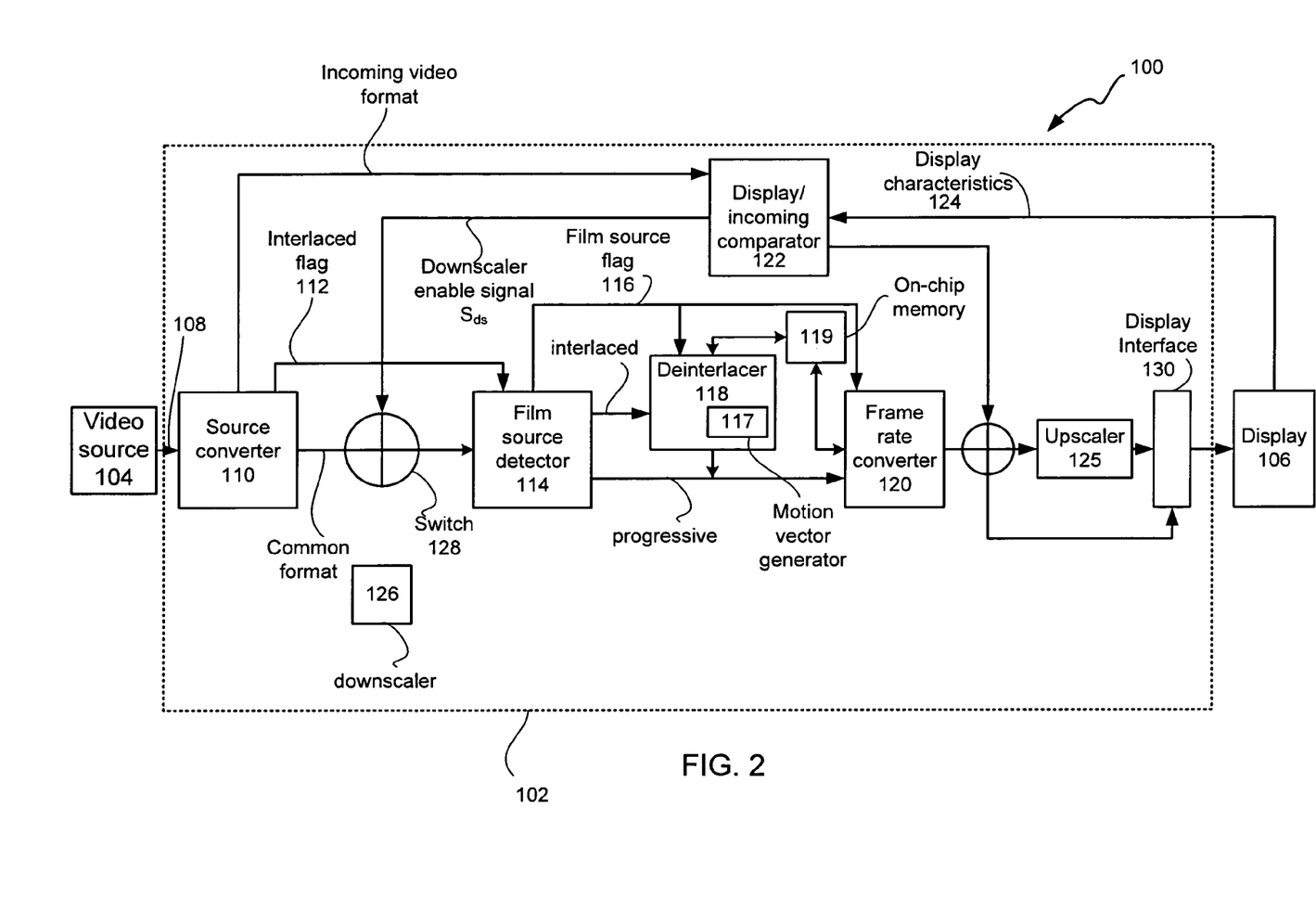
FIG. 2 shows a particular implementation of the multi-function display controller of FIG. 1.

However, the inventive controller 102 is not limited to a particular scaling protocol since other possible available downscaling protocols include, but are not limited to, a downscaling operation prior to de-interlacing while any upscaling is performed after any required frame rate conversion. This particular downscaling protocol would be suitable when the input video stream 108 is, for example, 1080I and the display resolution is set at UXGA resolution (1400×1200). In this case horizontal downscaling would be performed by the downscaler 126 before de-interlacing by the de-interlace 118 followed by frame rate conversion by the frame rate converter 120 and only then would the video be vertically up scaled by an upsealer 125. In general, it is preferable to downscale any video signal as soon as practicable since downscaling preserves memory bandwidth as well as processing and memory resources required by the controller 102. It should be noted that, in general, for upscaling situations (horizontal and vertical), the downscaler unit 126 is bypassed (as in FIG. 2) and to preferably de-interlace, frame rate convert and upscale in order.

Once an interlaced video is de-interlaced, the frame rate converter unit 120 receives the progressive scan video either from the de-interlace 118 or directly from the film source detector unit 114 in the case of native progressive scan video. The frame rate converter unit 120 then converts the progressive scan video to a display frame rate using either drop and repeat based frame rate conversion, temporal average frame rate conversion or motion compensation based frame rate conversion based upon signal content. For example, if it is determined that motion compensation does not satisfactorily improve perceived motion, then the drop and repeat type frame rate conversion or the temporal average frame rate conversion may be selected as opposed to the motion compensation frame rate conversion since additional artifacts may be introduced. Alternatively if it is determined that motion compensation does not satisfactorily improve perceived motion, then the frame rate converter could choose not to modify the output frame rate such that the output frame rate matches the input frame rate. If it is determined that motion compensation improves the image quality, then motion compensated frame rate conversion is done. In another embodiment, if it is determined that motion compensation is not appropriate, a selectable frame rate converter bypass may be used to bypass the frame rate converter 120. The switching between the modes of frame rate conversion or the different frame rates is done in a seamless fashion so as to not create any visual artifacts.

For example, NTSC based progressive scan video must still be approximately 60 frames per second for display. However, the most the de-interlace 118 does with the film based 3-2 pattern is keep count so it can easily predict whether the matching field comes before or after the field being processed. In the case of film, the de-interlaced output (at 60 Hz progressive) still consists of 24 Hz motion. Therefore, a frame rate converter unit 120 will take the unique film frames and convert them to a frame rate consistent with the display 106 based upon display characteristics provided manually or automatically by way of the data channel 124.

One of the advantages to using motion compensated frame rate conversion is that at low display refresh rates (for example, 50 fields/sec for interlaced video material, and 24 frames/sec for film-originated material) on progressive digital display devices, a display artifact referred to as "area flicker" can occur. The area flicker becomes more visible as the size of the display increases, due to the high sensitivity to flicker in the human visual peripheral region. A simple solution for reducing the area flicker is to increase the display refresh rate by repeating the input fields or frames at a higher rate (for example, 100 fields/sec for interlaced video). This solves the area flicker problem for static scenes. However, the repetition, does not greatly change the motion of the video images, introduces a new artifact in scenes with motion, known as "motion judder" or "motion smear," particularly in areas with high contrast, due to the human eye's tendency to track the trajectory of moving objects. For this reason, motion compensated frame interpolation is used.

In the described embodiment, the motion compensated frame rate conversion computes an interpolated frame at an intermediate point on a local motion trajectory, so that there is no discrepancy between an expected image motion due to eye tracking and a displayed image motion. The local image motion trajectory from one frame to the next is described by a motion vector that can be computed at different levels of spatial resolution, such as at a pixel level, at an image patch level, or at an object level.

Generally, for motion compensated approaches to work well, two basic assumptions are made about the nature of the object motion: 1) moving objects have inertia, and 2) moving objects are large. The inertia assumption implies that a motion vector changes only gradually with respect to a temporal vector sampling interval (that is, the frame rate in the digital video). The large objects assumption implies that a motion vector changes only gradually with respect to a spatial vector sampling interval, that is, the vector field is smooth and has only few boundary motion discontinuities.

It should be noted that in addition to frame rate conversion, de-interlacing, etc., the inventive display controller 102 both manipulates and positions the data, and defines the display rate in terms of frame, line, and pixel rates, as well as the number of active pixels per line and active lines per frame, based upon the requirements of a particular display device coupled thereto. In the described embodiments, these display requirements are communicated to the inventive display controller by way of the data channel 124 coupling the display and the controller. However, in some cases user supplied display requirements can also be provided that supercede or supplement the display requirements of the display.

As shown, the downscaler 126 and the upscaler 125 are shown in FIG. 1 as discrete entities for simplicity of illustration only and should not be construed to limit the implementation of the controller 102 to that of discrete entities. On the contrary, the upscaler 125 and the downscaler 126 can be implemented as a single multi-function scaler unit arranged to perform both upscaling and downscaling as required. In one embodiment, an output interface 130 provides additional image processing such as image enhancement, edge enhancement, contrast enhancement, etc. In one implementation, an optional noise reducer unit 121 is used remove any noise from the image stream.

Figure 3:
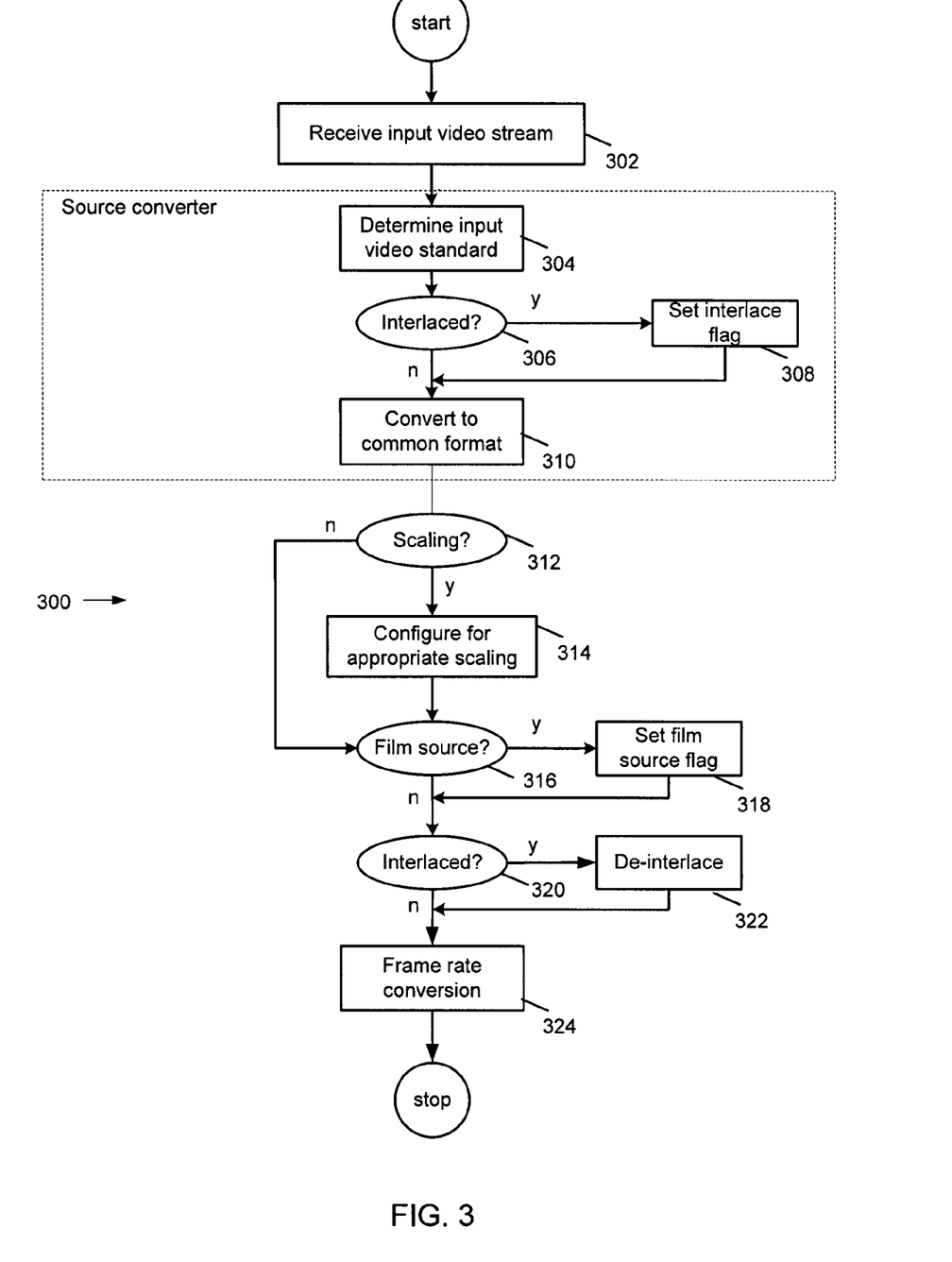
FIG. 3 shows a flowchart describing a process in accordance with an embodiment of the invention.

FIG. 3 shows a flowchart detailing a process 300 of processing an input video stream by a display controller in accordance with an embodiment of the invention. The process 300 begins at 302 by receiving a video signal at the controller. At 304, the input video standard is determined while at 306 a determination if the input video is interlaced. If the input video is interlaced, then an interlace flag is set at 308. In any case, at 310, the input video is converted to a common format while at 312 a determination is made if any scaling (either upscaling or downscaling) is required based upon the native input video resolution and the display requirements. If there is scaling, then the controller is optimally configured to perform the required scaling, otherwise, control is passed directly to 316 where a determination is made if the video is film originated video. If it is determined that the video is film originated video, then a film source flag is set at 318. In any case, at 320, a determination is made if the video is interlaced and if the video is interlaced, then at 322 the video is de-interlaced. In a particular embodiment, the de-interlacing is motion compensated based de-interlacing having motion vectors generated therewith stored in a local memory. In any case, the progressive video is frame rate converted (if necessary) prior to being forwarded to a display device for display thereon.

Figure 4:
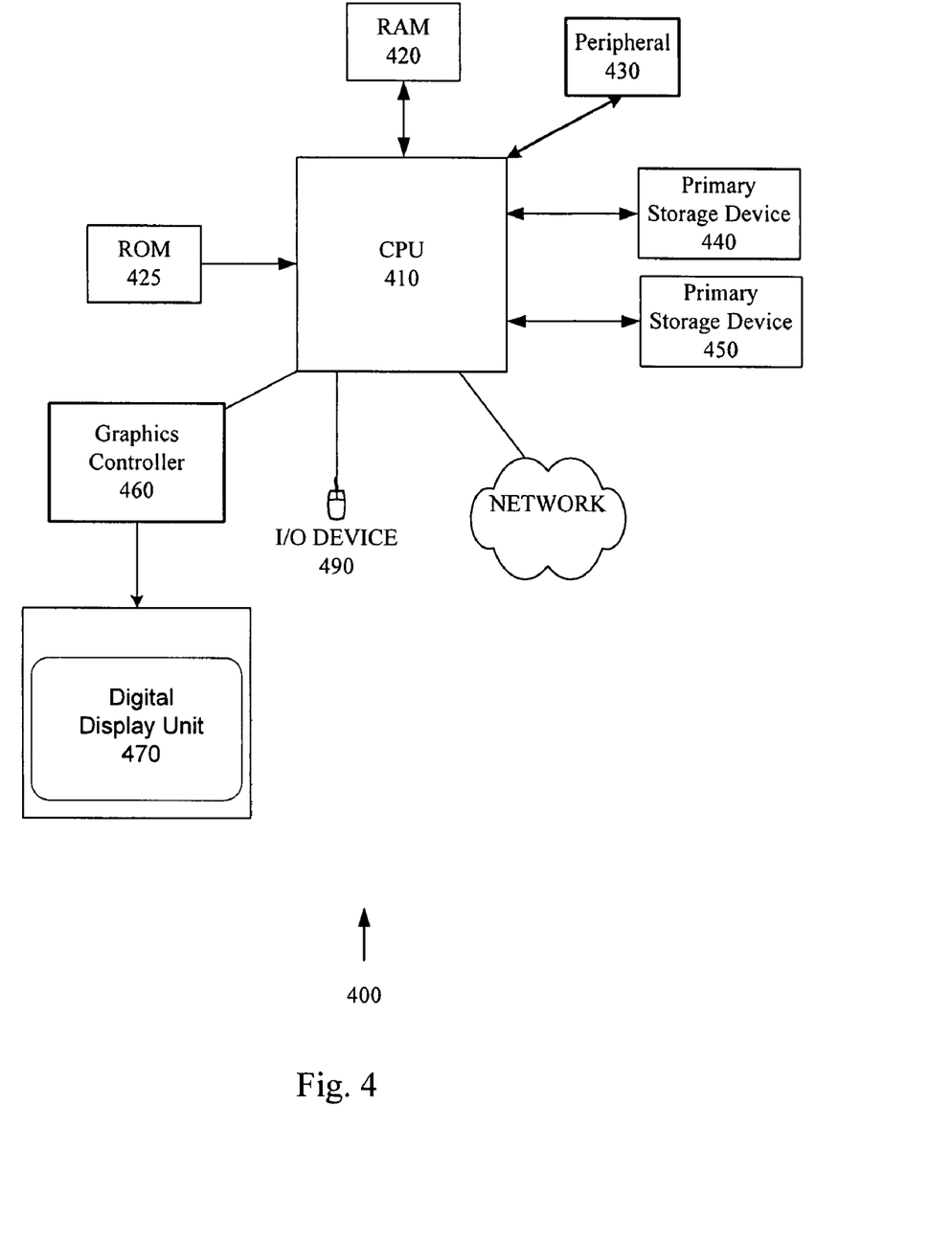
FIG. 4 illustrates a system employed to implement the invention.

FIG. 4 illustrates a system 400 employed to implement the invention. Computer system 400 is only an example of a graphics system in which the present invention can be implemented. System 400 includes central processing unit (CPU) 410, random access memory (RAM) 420, read only memory (ROM) 425, one or more peripherals 430, graphics controller 460, primary storage devices 440 and 450, and digital display unit 470. CPUs 410 are also coupled to one or more input/output devices 490 that may include, but are not limited to, devices such as, track balls, mice, keyboards, microphones, touch-sensitive displays, transducer card readers, magnetic or paper tape readers, tablets, styluses, voice or handwriting recognizers, or other well-known input devices such as, of course, other computers. Graphics controller 460 generates image data and a corresponding reference signal, and provides both to digital display unit 470. The image data can be generated, for example, based on pixel data received from CPU 410 or from an external encode (not shown). In one embodiment, the image data is provided in RGB format and the reference signal includes the $V_{SYNC}$ and $H_{SYNC}$ signals well known in the art. However, it should be understood that the present invention could be implemented with image, data and/or reference signals in other formats. For example, image data can include video signal data also with a corresponding time reference signal.

Although only a few embodiments of the present invention have been described, it should be understood that the present invention might be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a described embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

The invention claimed is:

1. An adaptive multi-function display controller arranged to receive an incoming video stream having an associated native video format from a video source and provide an outgoing video stream for display by a display unit at a display format, comprising:
   a video source converter unit for ascertaining the native video format, detecting if the incoming video stream is an interlaced video stream, and converting the incoming video stream to a common video format suitable for subsequent video processing by the controller;
   a comparator unit connected to the display and the source converter for comparing a set of display characteristics and the native video format and generating a downscaler enable signal based upon the comparison;
   a film source detector unit coupled to the video source converter unit arranged to determine if the input video stream is a film originated video stream;
   a de-interlace unit coupled to the film source detector unit for de-interlacing the input video stream, if needed, to form a progressive scan video stream;
   a multimode frame rate converter unit coupled to the de-interlace unit for converting the progressive scan video stream at a native frame rate to the display frame rate using motion compensated frame rate conversion by itself or in conjunction with any of a number of selectable other frame rate conversion modes; and
   an adaptive scaler unit arranged to scale the input video stream as required for display on the display unit following a scaling protocol based, in part, upon a native resolution of the incoming video stream and the display resolution.

2. An adaptive multi-function display controller as recited in claim 1, wherein the de-interlace unit includes a motion vector generator unit for generating a motion vector used for de-interlacing the video stream, if needed, and wherein the display controller further includes a memory device coupled to the motion vector generator unit for storing the motion vector.

3. An adaptive multi-function display controller as recited in claim 2, further comprising:
   a motion compensation type noise reducer unit that is used remove noise from the video stream, if needed, using the motion vectors stored in the memory device.

4. An adaptive multi-function display controller as recited in claim 1, wherein the multimode frame rate converter unit is configured to perform one or more modes of frame rate conversion selected from the group consisting of: drop and repeat based frame rate conversion, motion compensated type frame rate conversion and temporal average based frame rate conversion, and wherein the multimode frame rate converter unit is further configured to selectively perform one or more of the modes of frame rate conversion based upon a determination if motion compensation applied to the input video stream improves perceived motion.

5. An adaptive multi-function display controller as recited in claim 4, wherein when applied motion compensation would not improve perceived motion, then only drop and repeat based frame rate conversion is performed.

6. An adaptive multi-function display controller as recited in claim 4, wherein when applied motion compensation does not improve perceived motion, then only temporal average based frame rate conversion is performed.

7. An adaptive multi-function display controller as recited in claim 4, wherein when applied motion compensation does not improve perceived motion, then no frame rate conversion is performed.

8. An adaptive multi-function display controller as recited in claim 1, wherein the frame rate converter unit is arranged to not perform any frame rate conversion on the progressive scan video stream when deemed appropriate.

9. An adaptive multi-function display controller as recited in claim 1, wherein the source detector unit includes an inverse telecine detector for determining if the source of the input video stream is film by sensing an existing 3-2 pulldown or a 2-2 pulldown pattern in the interlaced video of the film source.

10. An adaptive multi-function display controller as recited in claim 1, wherein the display is an EDID based display having a corresponding set of EDID and wherein the scaler scales the video stream by upscaling or downscaling based upon the set of EDID.

11. An adaptive multi-function display controller as recited in claim 1, wherein the scaling protocol includes a downscaling operation prior to a de-interlacing operation and a frame rate conversion operation thereby preserving bandwidth.

12. An adaptive multi-function display controller as recited in claim 1, further comprising:
   an output interface coupled to the scaler and the display unit that provides additional image processing such as image enhancement, edge enhancement, contrast enhancement.

13. A method of processing an incoming video stream having a native video format from a video source to an outgoing video stream for display by a display unit at a display format by an adaptive multi-function display controller, comprising:
   converting the incoming video stream to a common video format suitable for subsequent video processing;
   de-interlacing the input video stream, if needed, to form a progressive scan video stream;

selecting a motion compensated frame rate conversion by itself or in conjunction with any of a number of other frame rate conversion modes;

converting the progressive scan video stream at a native frame rate to the display frame rate using the selected frame rate conversion mode;

providing a scaling protocol by comparing the native video format and the display format;

scaling the input video stream as required for display on the display unit based upon the scaling protocol; and providing the outgoing video stream to the display unit.

14. A method as recited in claim 13, further comprising:
determining if the input video stream is an interlaced video stream;
generating a motion vector; and
storing the motion vector.

15. A method as recited in claim 14, further comprising:
retrieving the stored motion vector; and
using the motion vector to de-interlace the interlaced video stream.

16. A method as recited in claim 14, comprising:
removing noise from the input video stream, if needed, using the motion vector.

17. A method as recited in claim 13, wherein the frame rate conversion mode is selected from a group that includes a selectable drop and repeat frame rate conversion mode, a motion compensation frame rate conversion mode, a temporal average frame rate conversion mode, and a no frame rate conversion mode.

18. A method as recited in claim 17, wherein the selection of the frame rate conversion mode is based upon a determination if motion compensation applied to the input video stream improves perceived motion and wherein when the motion compensation does not improve perceived motion, then only the drop and repeat based frame rate conversion mode is selected.

19. A method as recited in claim 17, wherein when applied motion compensation does not improve perceived motion, then no frame rate conversion is performed.

20. A method as recited in claim 13, further comprising:
determining if the video source is a film source by sensing an existing 3-2 pulldown or a 2-2 pulldown pattern when the input video stream is the interlaced input video stream.

21. A method as recited in claim 13, wherein the display unit is an EDID based display unit having a corresponding set of EDID and wherein the scaler scales the video stream by upscaling or downscaling based upon the set of EDID.

22. A method as recited in claim 13, wherein the scaling protocol includes a downscaling operation prior to a de-interlacing operation and a frame rate conversion operation thereby preserving bandwidth.

23. Computer program product for processing an incoming video stream having a native video format from a video source to an outgoing video stream for display by a display unit at a display format by an adaptive multi-function display controller, comprising:

computer code for converting the incoming video stream to a common video format suitable for subsequent video processing;

computer code for de-interlacing the input video stream, if needed, to form a progressive scan video stream;

computer code for selecting a motion compensated frame rate conversion by itself or in conjunction with any of a number of other frame rate conversion modes;

computer code for converting the progressive scan video stream at a native frame rate to the display frame rate using the selected frame rate conversion mode;

computer code for providing a scaling protocol by comparing the native video format and the display format;

computer code for scaling the input video stream as required for display on the display unit based upon the scaling protocol;

computer code for providing the outgoing video stream to the display unit; and computer readable medium for storing the computer code.

24. Computer program product as recited in claim 23, further comprising:
computer code for determining if the input video stream is an interlaced video stream;
computer code for generating a motion vector; and
computer code for storing the motion vector.

25. Computer program product as recited in claim 24, further comprising:
computer code for retrieving the stored motion vector; and
computer code for using the motion vector to de-interlace the interlaced video stream.

26. Computer program product as recited in claim 24, comprising:
computer code for removing noise from the input video stream, if needed, using the motion vector.

27. Computer program product as recited in claim 23, wherein the frame rate conversion mode is selected from a group that includes a selectable drop and repeat frame rate conversion mode, a motion compensation frame rate conversion mode, a temporal average frame rate conversion mode, and a no frame rate conversion mode.

28. Computer program product as recited in claim 27, wherein the selection of the frame rate conversion mode is based upon a determination if motion compensation applied to the input video stream improves perceived motion and wherein when the motion compensation does not improve perceived motion, then only the drop and repeat based frame rate conversion mode is selected.

29. Computer program product as recited in claim 27, wherein when applied motion compensation does not improve perceived motion, then no frame rate conversion is performed.

30. Computer program product as recited in claim 23, further comprising:
computer code for determining if the video source is a film source by sensing an existing 3-2 pulldown or a 2-2 pulldown pattern when the input video stream is the interlaced input video stream.

31. Computer program product as recited in claim 23, wherein the display unit is an EDID based display unit having a corresponding set of EDID and wherein the scaler scales the video stream by upscaling or downscaling based upon the set of EDID.

32. Computer program product as recited in claim 23, wherein the scaling protocol includes a downscaling operation prior to a de-interlacing operation and a frame rate conversion operation thereby preserving bandwidth.

33. A system, comprising:
a display unit;
a video source converter unit for ascertaining a first video format of an incoming video stream including a first frame rate and for converting the incoming video stream to a video format suitable for subsequent video processing; and
a multimode frame rate converter unit arranged to convert in real time the incoming video stream at the first frame rate to a second frame rate suitable for display on the display unit, wherein the multimode frame rate converter automatically selects and executes one or more of a number of frame rate conversion modes based upon the first frame rate, the second frame rate, display requirements of the display unit, and video content within the incoming video stream to produce an outgoing video stream at the second frame rates, wherein the multimode frame rate converter unit is configured to perform one or more modes of frame rate conversion selected from the group consisting of: drop and repeat based frame rate conversion, motion compensated type frame rate conversion and temporal average based frame rate conversion, and wherein the multimode frame rate converter unit is further configured to selectively perform one or more of the modes of frame rate conversion based upon a determination if motion compensation applied to the input video stream improves perceived motion.

34. A system as recited in claim 33, wherein the video source converter unit is further configured to detect if the incoming video stream is an interlaced video stream.

35. A system as recited in claim 34, further comprising a comparator unit coupled with the display unit and the video source converter unit for comparing a set of display characteristics and the first video format and generating a downscaler enable signal based upon the comparison.

36. A system as recited in claim 35, further comprising a film source detector unit coupled with the video source converter unit arranged to determine if the incoming video stream is a film originated video stream.

37. A system as recited in claim 36, further comprising a de-interlace unit coupled to the film source detector unit for de-interlacing the incoming video stream if the incoming video stream is interlaced to form a progressive scan video stream.

38. A system as recited in claim 37, further comprising an adaptive scaler unit arranged to scale the incoming video stream as required for display on the display unit following a scaling protocol based, in part, upon a first resolution of the incoming video stream and a resolution of the display unit.

39. A system as recited in claim 38, wherein the scaling protocol includes a downscaling operation prior to a de-interlacing operation and a frame rate conversion operation thereby preserving bandwidth.

40. A system as recited in claim 38, further comprising an output interface coupled to the scaler unit and the display unit that provides additional image processing such as image enhancement, edge enhancement, contrast enhancement.

41. A system as recited in claim 37, wherein the de-interlace unit includes a motion vector generator unit for generating a motion vector used for de-interlacing the video stream, if needed, and wherein the system further includes a memory device coupled to the motion vector generator unit for storing the motion vector.

42. A system as recited in claim 41, further comprising a motion compensation type noise reducer unit that is used remove noise from the video stream, if needed, using the motion vectors stored in the memory device.

43. A system as recited in claim 33, wherein the frame rate converter unit is arranged to not perform any frame rate conversion on the progressive scan video stream when deemed appropriate.

44. A system as recited in claim 33, wherein when motion compensated frame rate conversion would not improve perceived motion, then only drop and repeat based frame rate conversion is performed.

45. A system as recited in claim 33, wherein when motion compensated frame rate conversion would not improve perceived motion, then only temporal average based frame rate conversion is performed.

* * * * *